United States Patent
Sasage

(10) Patent No.: US 7,606,958 B2
(45) Date of Patent: Oct. 20, 2009

(54) INTERRUPT CONTROL METHOD, INTERRUPT CONTROL APPARATUS AND INTERRUPT CONTROL MEDIUM

(75) Inventor: Koutarou Sasage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/238,952

(22) Filed: Sep. 30, 2005

(65) Prior Publication Data
US 2006/0020731 A1    Jan. 26, 2006

Related U.S. Application Data

(63) Continuation of application No. PCT/JP03/07870, filed on Jun. 20, 2003.

(51) Int. Cl.
*G06F 12/00* (2006.01)
*G06F 13/26* (2006.01)
*G06F 13/36* (2006.01)

(52) U.S. Cl. .............. 710/260; 710/113; 710/244; 324/719; 709/207

(58) Field of Classification Search ............ 710/116, 710/244, 260, 261, 262, 264, 265; 324/719; 709/207
See application file for complete search history.

(56) References Cited

U.S. PATENT DOCUMENTS

| | | | | |
|---|---|---|---|---|
| 4,001,783 A * | 1/1977 | Monahan et al. | ............ | 710/264 |
| 4,035,780 A * | 7/1977 | Kristick et al. | ............ | 710/244 |
| 5,099,414 A * | 3/1992 | Cole et al. | ............ | 709/207 |
| 5,410,715 A * | 4/1995 | Ishimoto et al. | ............ | 710/264 |
| 6,026,459 A * | 2/2000 | Huppenthal | ............ | 710/116 |
| 6,081,867 A * | 6/2000 | Cox | ............ | 710/264 |
| 6,265,885 B1 * | 7/2001 | Luo et al. | ............ | 324/719 |
| 6,539,448 B1 * | 3/2003 | Deng | ............ | 710/260 |
| 6,581,119 B1 * | 6/2003 | Maeda et al. | ............ | 710/260 |
| 6,581,120 B1 * | 6/2003 | Ko | ............ | 710/262 |
| 6,601,122 B1 * | 7/2003 | Broberg et al. | ............ | 710/266 |
| 6,738,847 B1 * | 5/2004 | Beale et al. | ............ | 710/260 |
| 6,865,636 B1 * | 3/2005 | Hober et al. | ............ | 710/260 |
| 6,928,502 B2 * | 8/2005 | Monteiro | ............ | 710/265 |
| 7,043,584 B2 * | 5/2006 | Schultz | ............ | 710/261 |
| 2002/0002648 A1 | 1/2002 | Kawase et al. | | |

(Continued)

FOREIGN PATENT DOCUMENTS

JP    52-10642    1/1977

(Continued)

OTHER PUBLICATIONS

Japanese Patent Office Notice of Rejection Grounds, mailed Dec. 5, 2006, and issued in corresponding Japanese Patent Application No. 2005-500916.

*Primary Examiner*—Mark Rinehart
*Assistant Examiner*—Jeremy S Cerullo
(74) *Attorney, Agent, or Firm*—Staas & Halsey LLP

(57) ABSTRACT

Once accepting an interrupt, the control is such as to not accept any interrupt including that highest priority within the group to which the interrupt about to be processed belongs by referring to the interrupt management table. Then the vector number for the highest priority in the group from among the received interrupts is selected. Then the processing of a handler for the selected vector number is executed. The priority of the executed interrupt processing is reset to the lowest priority in the group.

5 Claims, 10 Drawing Sheets

U.S. PATENT DOCUMENTS

2003/0018842 A1* 1/2003 Harbin .................. 710/260
2003/0172215 A1* 9/2003 Franke et al. ............ 710/264

FOREIGN PATENT DOCUMENTS

| JP | 58-171541 | 11/1983 |
| JP | S58-171541 | 11/1983 |
| JP | 4-363748 | 12/1992 |
| JP | 8-30464 | 2/1996 |
| JP | 9-251387 | 9/1997 |
| JP | 2000-122963 | 4/2000 |
| JP | 2002-24034 | 1/2002 |
| JP | 2002-55830 | 2/2002 |
| JP | 2002-163120 | 6/2002 |

* cited by examiner

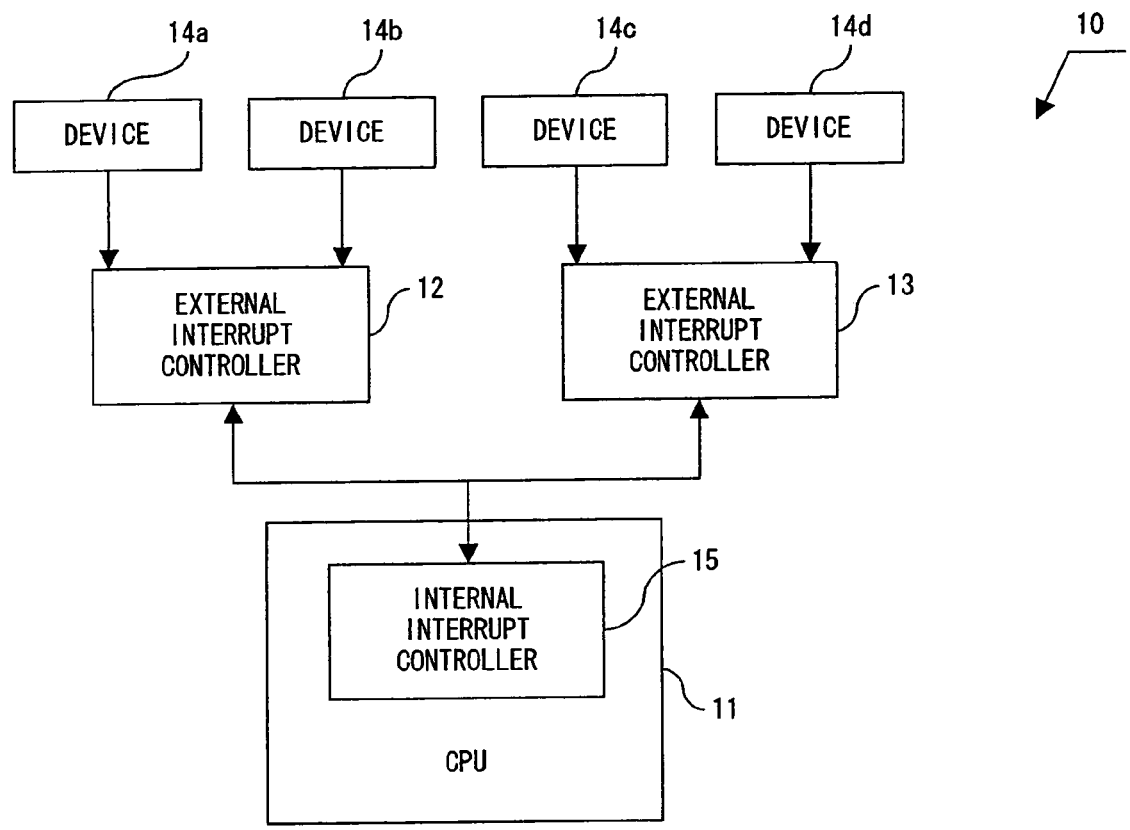
F I G. 1

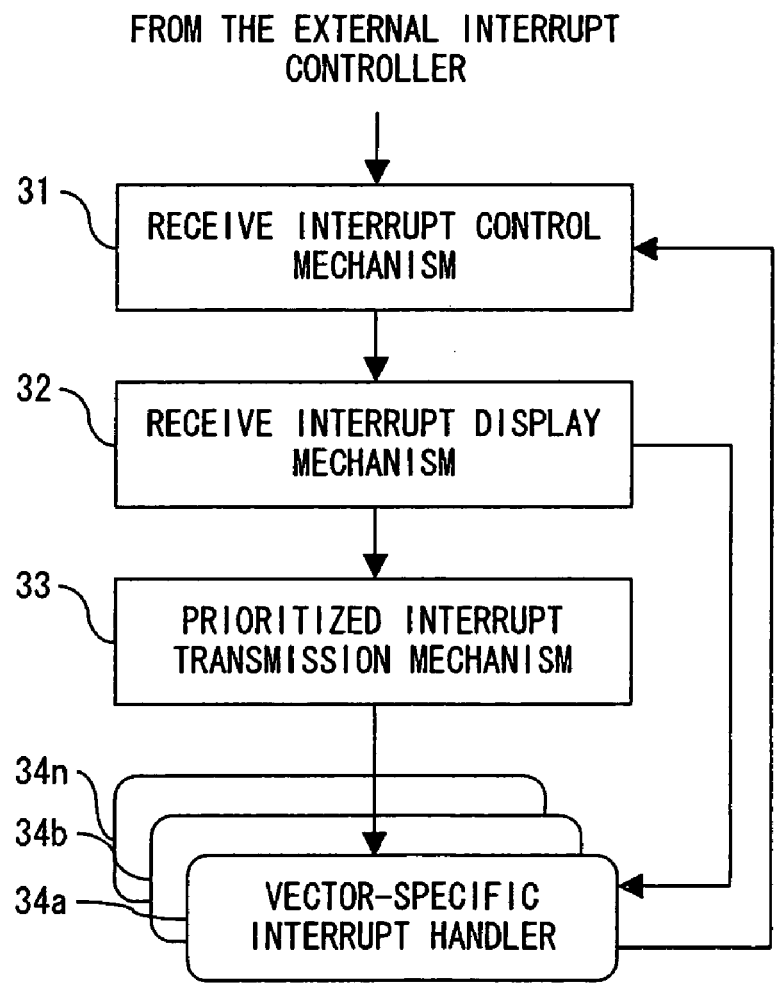
F I G. 3

| VECTOR NUMBER | GROUP NUMBER | VECTOR NUMBER FOR THE HIGHEST PRIORITY WITHIN EACH GROUP |
|---|---|---|
| 0 | 0 | 2 |
| 1 | 0 | 2 |
| 2 | 0 | 2 |
| 3 | 1 | 4 |
| 4 | 1 | 4 |
| 5 | 2 | 7 |
| 6 | 2 | 7 |
| 7 | 2 | 7 |
| 8 | 3 | : |
| : | : | : |

41

F I G. 5

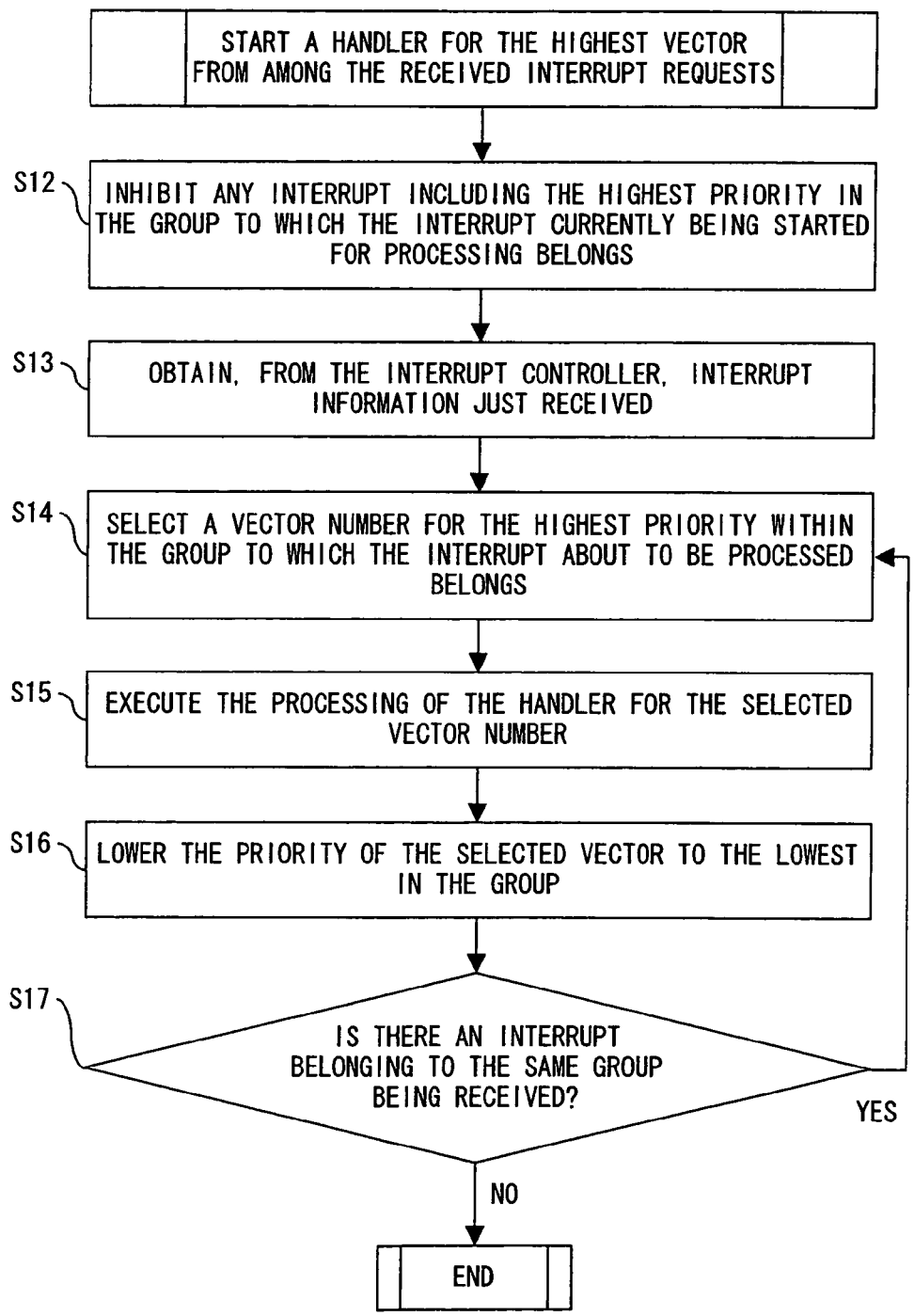
F I G. 7

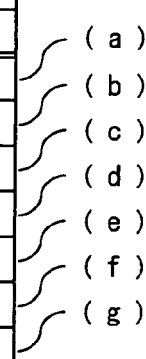
F I G. 9

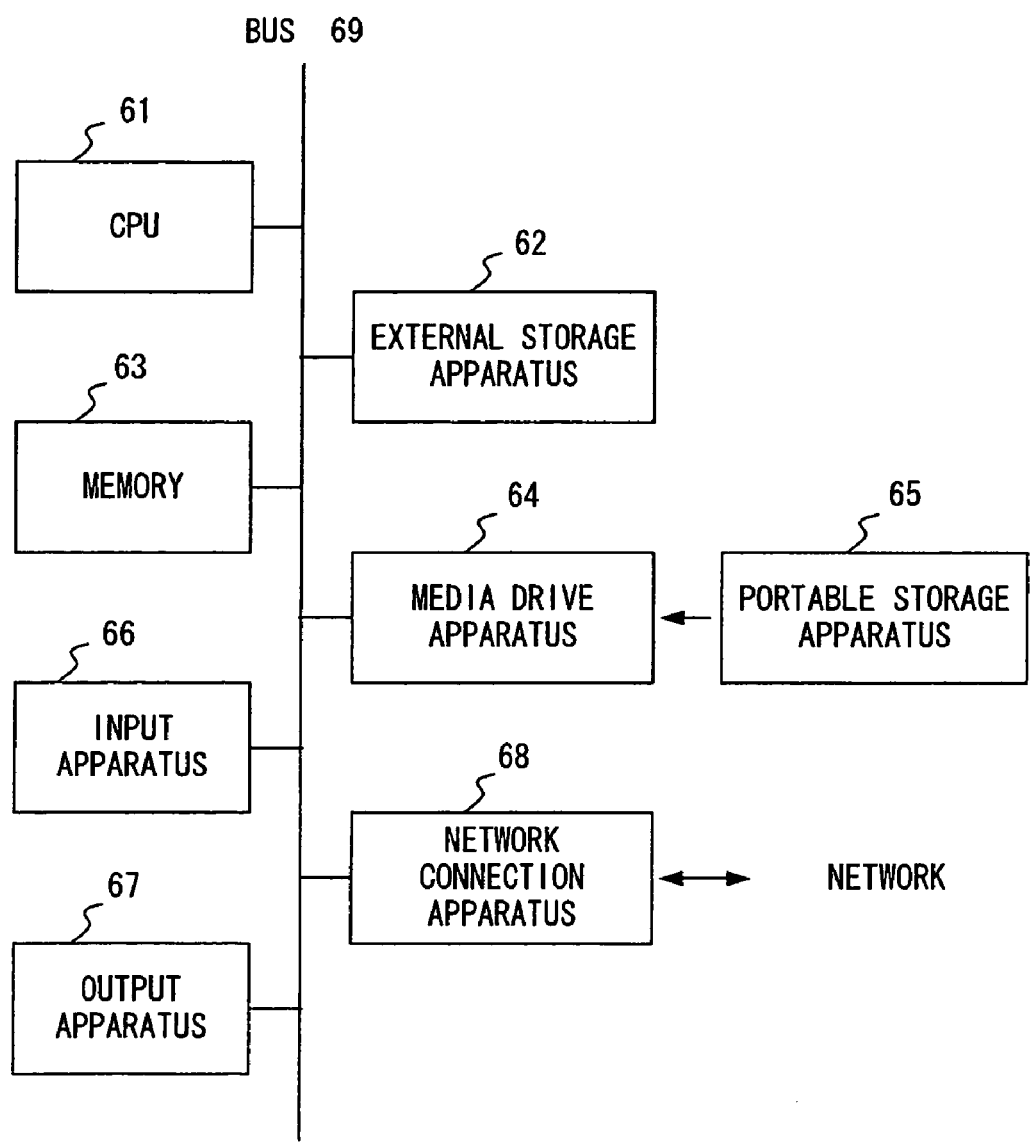
F I G. 10

INTERRUPT CONTROL METHOD, INTERRUPT CONTROL APPARATUS AND INTERRUPT CONTROL MEDIUM

CROSS REFERENCE TO RELATED APPLICATION

This application is a continuation of international PCT application No. PCT/JP2003/007870 filed on Jun. 20, 2003.

BACKGROUND OF THE INVENTION

1. Field of the Invention

The present invention relates to a method for controlling a plurality of interrupts with different priorities thereof being defined, an interrupt controlling apparatus and program.

2. Description of the Related Art

In a computer furnished with a plurality of hardware devices, interrupt control is performed to receive processing requests from the respective hardware devices. Such interrupts are usually defined by priorities for executing in the order of the defined priority.

In a system where a plurality of hardware devices having similar functions share separate interrupt resources, if the respective hardware devices are given different priorities vis-á-vis interrupts, the frequencies of execution may vary a great deal despite each hardware device having a similar function, because the processes are executed in accordance with the defined priorities. In an extreme case, processing for a low priority hardware device may not be executed at all.

On the other hand, if each hardware device is allocated the same priority vis-á-vis interrupt, a hardware device causing an interrupt cannot be identified until the status of each hardware device is confirmed, necessitating confirmation of status information of all the hardware devices which have not caused the interrupt as well. Reading the status information of hardware devices consumes a great deal of processing time, hence causing the problem of decreased processing efficiency of a system.

With regard to control of interrupt processing corresponding to a plurality of interrupting causes, Japanese unexamined patent application publication No. 2002-55830 notes a method in which interrupt causes are divided into groups in accordance with urgency and an interrupt signal is outputted by the unit of the group, for example.

SUMMARY OF THE INVENTION

The challenge of the present invention is to process a plurality of interrupts with different priorities evenly. The another challenge of the present invention is to prevent a low priority interrupt among a plurality of interrupts which are given different priorities from being subjected to deferred processing.

An interrupt control method according to the present invention for making a computer execute processing of a plurality of interrupts defined as different priorities, divides a plurality of interrupts defined as different priorities into groups; makes a storage unit store information for identifying an interrupt, for indicating the priority of the interrupt and for indicating a group; and controls an interrupt so as not to accept the interrupt including the highest priority in the group to which the interrupt belongs after accepting the interrupt.

According to the present invention, accepting no interrupt including the highest priority in a group to which the interrupt belongs after accepting an interrupt prevents prior execution of another interrupt defined as a high priority in the same group that has occurred later, solving the problem of lower priority interrupts being subjected to deferred processing.

Another interrupt control method according to the present invention for making a computer execute processing for a plurality of interrupts defined as different priorities, divides a plurality of interrupts defined as different priorities into groups; makes a storage unit store information for identifying the interrupt, for indicating the priority of the interrupt and for indicating its group; controls the interrupt so as not to accept the interrupt including the highest priority in the group to which the interrupt belongs after accepting the interrupt; and changes the priority of the interrupt for which processing is completed to the lowest of the group.

According to the present invention, even if an interrupt which has the high priority in the group is executed, the priority of the interrupt is then changed to the lowest in the group, thus making it possible to execute a plurality of interrupts with different priorities in the group evenly.

The above described invention makes it possible for the storage unit to store a vector number being defined uniquely for the interrupt and for indicating a priority of the interrupt, a group number to which the interrupt belongs and the vector number for the highest priority in the group wherein when accepting an interrupt an interrupt which has a vector number below the highest priority within the same group that is stored in the storage unit will not be accepted.

With such a configuration it is possible to process a plurality of interrupts defined by different priorities evenly by obtaining the vector number for the highest priority of the group from the storage unit and controlling interrupts so as not to accept interrupts beneath the highest priority vector number.

BRIEF DESCRIPTION OF DRAWINGS

FIG. 1 shows a hardware configuration of a preferred embodiment;

FIG. 3 describes an interrupt control mechanism;

FIG. 5 shows an interrupt management table;

FIG. 7 is a flow chart of interrupt control processing;

FIG. 9 shows how interrupt priorities change in a group; and

FIG. 10 shows a configuration of an information processing apparatus.

DESCRIPTION OF THE PREFERRED EMBODIMENTS

The following describes a preferred embodiment of the present invention while referring to the accompanying drawings. FIG. 1 shows a computer, external interrupt controllers and hardware devices according to the preferred embodiment.

A CPU 11 comprised by the computer (i.e., interrupt control apparatus) 10 is connected to the external interrupt controllers 12 and 13, both of which receive interrupt requests inputted from a plurality of hardware devices 14a through 14d.

The respective priorities for the hardware devices 14a through 14d are set by an interrupt vector management table 21 (Refer to FIG. 2) comprised by the external interrupt controllers 12 and 13.

Figure 2:
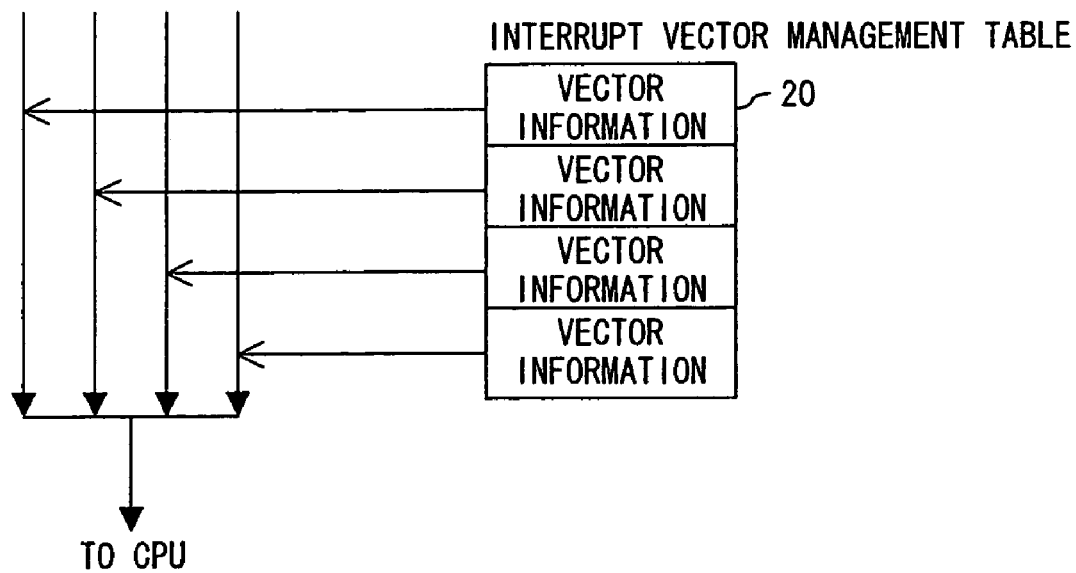
FIG. 2 shows a vector management table of an external interrupt controller.

In the interrupt vector management table 21 shown by FIG. 2, vector information is stored, that is, the priority information and vector numbers or vector numbers including priority information of the hardware devices 14a through 14d. The external interrupt controllers 12 and 13 output vector information contained in the interrupt vector management table 21 to the CPU 11.

The CPU 11 lets an internal interrupt controller 15 receive an interrupt request outputted from the external interrupt controllers 12 and 13, and selects an interrupt to be executed by referring to the interrupt management table which has divided the interrupts of the respective hardware devices 14a through 14d into groups.

Next, FIG. 3 describes an interrupt control mechanism.

A receive interrupt control mechanism 31 is a hardware mechanism for controlling reception of specific interrupts from the external interrupt controllers 12 and 13.

A receive interrupt display mechanism 32 is a hardware mechanism for displaying interrupt information being received.

A prioritized interrupt transmission mechanism 33 is a hardware mechanism for processing interrupts in order of priority.

Vector-specific interrupt handlers 34a through 34n are software modules for executing interrupt processing for the respective vectors.

Figure 4:
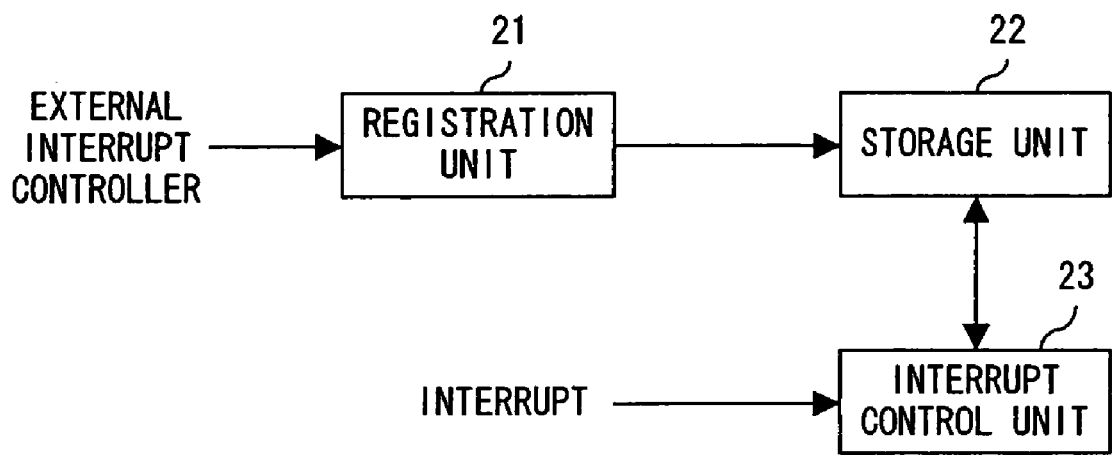
FIG. 4 describes an interrupt mechanism of a CPU.

FIG. 4 describes an interrupt mechanism of the CPU 11.

A registration unit 21 divides interrupts set for the respective hardware devices 14a through 14d into groups to register in a storage unit 22.

The storage unit 22 stores the information for identifying an interrupt, for indicating the priority of an interrupt and for indicating a group.

An interrupt control unit 23 obtains information indicating the highest priority in the group to which the interrupt belongs by referring to the storage unit 22 and controls processing so as not to accept any interrupt including the highest priority after accepting an interrupt. Furthermore, the interrupt control unit 23 changes the priority of the just processed interrupt to the lowest priority in the same group.

This will prevent another interrupt of a higher priority in the same group, even if it occurs, from being accepted after accepting the previous interrupt, thereby preventing an interrupt of a lower priority from being subjected to deferred processing. Furthermore, lowering the priority of the already processed interrupt to the lowest in the group makes it possible to execute the interrupts of all the hardware devices 14a through 14d with respectively differing priorities evenly.

The first description is of dividing interrupts into groups. The CPU 11 divides the interrupts of the hardware devices 14a through 14d into groups to create an interrupt management table 41 in advance as shown by FIG. 5.

The interrupt management table 41 comprises a plurality of data made up of the vector numbers assigned to the respective hardware devices 14a through 14d of interrupt, the group number to which the interrupt belongs and vector numbers for the highest priority vector within each group, where the larger the vector number is, the higher the priority of the interrupt. Interrupts of the lowest priority, with the vector number 0, to those of higher priorities are registered in order in the interrupt management table 41 shown by FIG. 5.

As shown by FIG. 5, the interrupts with the vector numbers 0, 1 and 2 are assigned to the same group with the group number 0. In this case the vector number for the highest priority in the group is the vector number 2, and therefore each of the vector numbers 0 through 2 are assigned "2" as the highest priority vector number of the group.

The interrupts of the vector numbers 3 and 4 are assigned to a group with the group number 1. In this case the highest priority vector number in the group is the vector number 4, and therefore each of the vector numbers 3 and 4 are assigned "4" as the highest priority vector number of the group.

The interrupts of the vector numbers 5, 6 and 7 are assigned to the group with the group number 2. In this case the vector number for the highest priority in the group is the vector number 7, and therefore each of the vector numbers 5 through 7 are assigned "7" as the highest priority vector number of the group.

Figure 6:
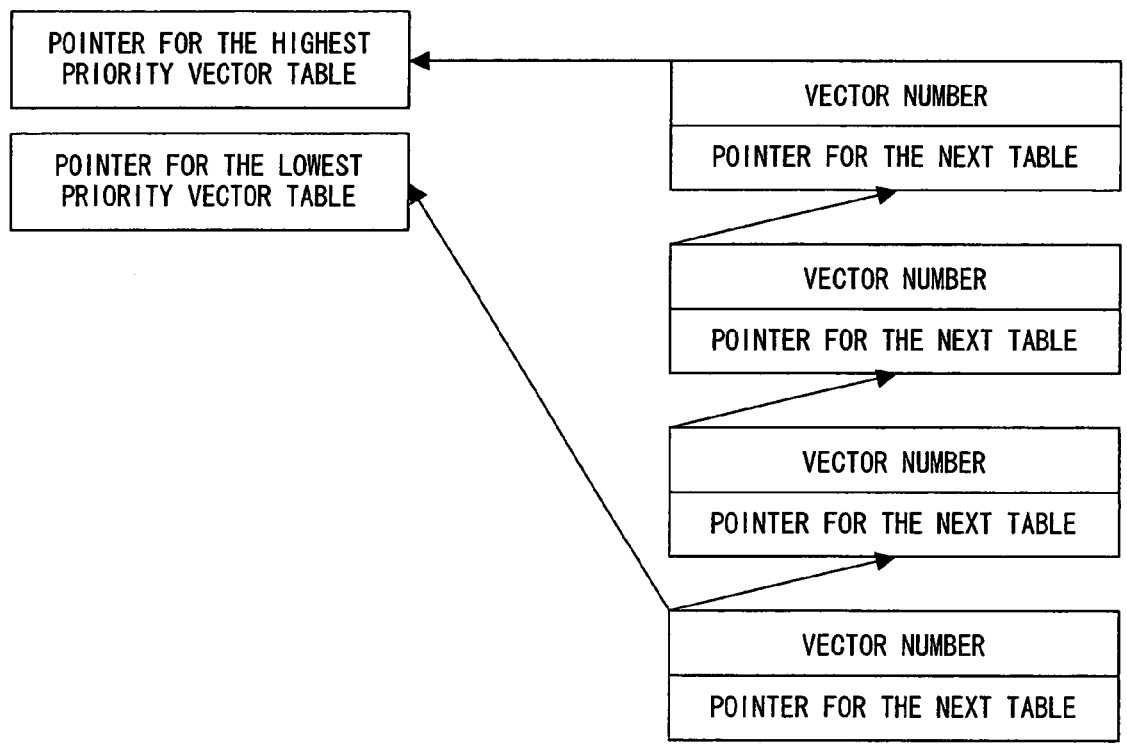
FIG. 6 shows an intra-group priority management list.

Next, FIG. 6 shows the structure of an intra-group priority management list for managing the priority within a group.

In the intra-group priority management list, a plurality of tables, connected by unidirectional links, made up of a vector number for an interrupt belonging to the same group and a pointer indicating a table storing the vector number for the next in the order of priority.

In FIG. 6, the table storing the highest priority vector number information stores the vector number and a pointer for indicating the table storing the next vector number information, and the table indicated by the aforementioned pointer stores the vector number of the second priority and a pointer indicating a table storing the vector number of the next highest priority. Likewise, the tables are linked in order of priority. In addition, the pointer for the lowest priority vector table stores the pointer information for indicating the smallest vector number among the interrupts belonging to the same group, and the pointer for the highest priority vector table stores the pointer information for indicating the largest vector number.

The above described each table, pointer for the lowest priority vector table and pointer for the highest priority vector table constitute the intra-group priority management list. The pointer in the intra-group priority management list makes it possible to determine the vector number for the highest priority in the group.

The next description is of interrupt control processing based on the above described table while referring to the flow chart shown by FIG. 7. The CPU 11 executes the following processing. A handler (i.e., interrupt processing) for the highest vector from among the received interrupt requests is started in the interrupt processing.

Referring to FIG. 7, first of all, the processing is to inhibit any interrupt including the highest priority in the group to which the interrupt currently being started for processing belongs by referring to the interrupt management table 41 (S12 shown by FIG. 7; simply "S12" hereinafter).

The above described processing inhibits acceptance of an interrupt even if another interrupt of a higher priority in the same group as the one currently being processed occurs.

Next, obtain, from the interrupt controller 15; interrupt information just being received (S13).

If there is a plurality of interrupts being received, select the vector number for the highest priority within the group to which the interrupt about to be processed belongs by referring to the obtained interrupt information (S14).

Next, execute the processing of the handler for the selected vector number (S15) in which the processing is executed for the largest vector number among the interrupts currently received, that is, the highest priority.

Then, reset the priority of the selected vector to the lowest in the group (S16).

The above described processing changes the priority of the already processed interrupt to the lowest in the group even if the interrupt itself was originally of a high priority, hence solving the problem of processing the higher priority interrupt requests repeatedly resulting in the lower priority interrupts always being subjected to deferred processing.

Then, judge whether or not there is another interrupt belonging to the same group being received (S17)

If there is another interrupt belonging to the same group being received ("yes" for S17), then return to step S14 and repeat the above described processes by selecting a vector number for the next high priority interrupt from among the received interrupts belonging to the same group.

Conversely, if there is no received interrupt which belongs to the same group ("no" for S17), the processing ends there and then.

Figure 8:
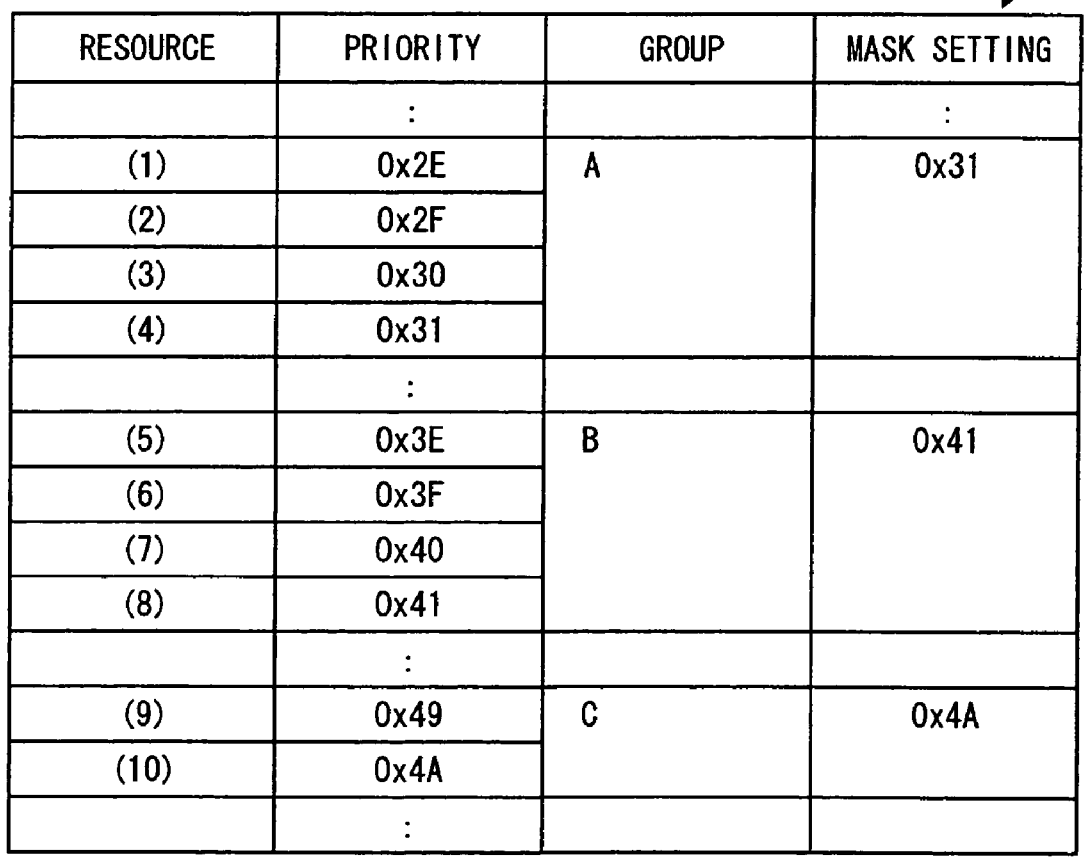
FIG. 8 exemplifies an interrupt management table.

The next description is of the relationship among the interrupt resources, the group and priority for limiting interrupts, in the case of registering interrupts thereof to be executed evenly to the same group, while referring to FIG. 8.

A table 51 shown by FIG. 8 contains the interrupt resources of respective hardware devices (1) through (10), the priority of each resource, the groups to which the respective resources belong and the masked priorities for executing interrupts within the respective groups.

As the value (in hexadecimal) for the priority becomes higher the priority becomes higher, with the priority of the interrupt resource (1) being the lowest at "0x2E" and the interrupt resource (10) being the highest at "0x4A."

For the group A, the set value for masking an interrupt is "0x31" which is the highest priority for the interrupt resources belonging to the group A.

Therefore, interrupts of the priority "0x31" and thereunder are masked when accepting an interrupt belonging to the group A, thus inhibiting the other interrupts belonging to the group A from being accepted. This will inhibit an interrupt belonging to the same group A from being accepted if it occurs later, eliminating the possibility of a lower priority interrupt which has been accepted first from being subjected to deferred processing.

Likewise for the group B, the set value for masking an interrupt is "0x41" which is the highest priority for the interrupt resources belonging to the group B.

Therefore, interrupts of the priority "0x41" and thereunder are masked when accepting an interrupt belonging to the group B, thus inhibiting the other interrupts belonging to the group B from being accepted. This will inhibit an interrupt belonging to the group B from being accepted if it occurs later, eliminating the possibility of a lower priority interrupt which has been accepted first from being subjected to deferred processing.

Also, for the group C, the set value for masking an interrupt is "0x4A" which is the highest priority for the interrupt resources belonging to the group C, thus inhibiting the other interrupts belonging to the group C from being accepted. This will inhibit an interrupt belonging to the group C from being accepted if it occurs later, eliminating the possibility of a lower priority interrupt which has been accepted first from being subjected to deferred processing.

The description from this point on is of how the interrupt control of the present embodiment changes interrupt priorities within a group and is given while referring to FIG. 9.

FIG. 9 shows how the priorities of interrupt resources belonging to the group A (according to the table 51 shown by FIG. 8) change within the group. As the value of the priority becomes smaller, the priority becomes higher in FIG. 9, with the value "1" being the highest priority and "2" being the second highest priority for example.

In the initial state, the priority of the interrupt resource (1) is the highest at "1" within the group, followed by the interrupt resource (2) being the second highest at "2", followed by the interrupt resource (3) being the third highest at "3", followed by the interrupt resource (4) being the lowest within the group at "4", as shown by FIG. 9(a).

In the above state, as an interrupt by the interrupt resource (1) occurs to be executed by the CPU 11, the priority of the processed interrupt resource (1) will be changed to the lowest within the group at "4" after executing the processing, as shown by FIG. 9(b). Along with this change of priority, the priority of the second highest priority interrupt resource (2) is now changed from "2" to "1", that of the third highest priority interrupt resource (3) is now changed from "3" to "2", and that of the fourth priority resource (4) is now changed from "4" to "3".

That is, the interrupt resources originally set for high priorities by the external interrupt controllers 12 and 13 are now reset to the lowest priority within the group after the CPU 11 executes the applicable interrupt processes. This prevents only the interrupts of the high priority hardware devices of one group from being executed.

Next, let it be assumed that interrupts of the interrupt resources (3) and (4) occur at the same time in the state of priorities settings shown by FIG. 9(b) In this case, the priorities in the group are such that the priority of the interrupt resource (3) is "2", which is a higher priority than that of the interrupt resource (4) at "3", and therefore the CPU 11 executes the interrupt of the interrupt resource (3), followed by the CPU 11 changing the priorities in the group after executing the processing as shown by FIG. 9(c).

That is, the priority of the processed interrupt resource (3) is changed from "2" to "4", with the priority of the then highest priority, i.e., the interrupt resource (2), being unchanged at "1", that of the third priority, i.e., the interrupt resource (4), being changed from "3" to "2" and that of the fourth priority, i.e., the interrupt resource (1), being changed from "4" to "3".

Subsequently, the CPU 11 executes the processing for the interrupt resource (4), changing the priorities in the group as shown by FIG. 9(d).

That is, the priority of the processed interrupt resource (4) is changed from "2" to "4", with the priority of the highest priority, i.e., the interrupt resource (2), being unchanged at "1", that of the third priority, i.e., the interrupt resource (1), being changed from "3" to "2" and that of the fourth priority, i.e., the interrupt resource (3), being changed from "4" to "3".

Then, let it be assumed that interrupts raised by the interrupt resources (1), (2) and (4) occur at the same time in the state of setting priorities shown by FIG. 9(d). In this case, the CPU 11 first executes the process for the highest priority (2) being at the priority of "1" among the aforementioned three resources. Then, the CPU 11 changes the priorities within the group to those as shown by FIG. 9(e) after executing the processing.

As shown by FIG. 9(e), the priority of the processed interrupt resource (2) is changed from "1" to "4", with the priority of the second highest priority, i.e., the interrupt resource (1), being changed from "2" to "1", in addition, that of the third priority, i.e., the interrupt resource (3), being changed from "3" to "2" and that of the fourth priority, i.e., the interrupt resource (4), being changed from "4" to "3".

Then, the CPU 11 executes the processing for the higher interrupt priority (1) from between the unprocessed interrupt resources, i.e., the (1) and (4), in the state of priority settings shown by FIG. 9(e), followed by changing the priorities within the group as shown by FIG. 9(f) after executing the processing.

As shown by FIG. 9(f), the priority of the processed interrupt resource (1) is changed from "1" to "4", with the priority of the second highest priority, i.e., the interrupt resource (3), being changed from "2" to "1", in addition, that of the third priority, i.e., the interrupt resource (4), being changed from "3" to "2".

Subsequently, the CPU 11 executes the processing for the remaining interrupt resource (4) in the state of priority settings shown by FIG. 9(f), followed by changing the priorities within the group as shown by FIG. 9(g) after executing the processing.

As shown by FIG. 9(g), the priority of the processed interrupt resource (4) is changed from "2" to "4", with the priority of the first priority interrupt resource (3) remaining unchanged at "1", in addition, that of the third priority, i.e., the interrupt resource (2), being changed from "3" to "2" and that of the fourth priority, i.e., the interrupt resource (1), being changed from "4" to "3".

As described above, resetting the priority of the interrupt-processed hardware devices to the lowest priority in the group makes it possible for the frequency of executing interrupts with different priorities therein to be even.

The next description is of an example of a hardware configuration of a computer (i.e., information processing apparatus) according the present embodiment while referring to FIG. 10.

A CPU 61 executes the above described interrupt control processing. An external storage apparatus 62 stores not only a program such as the OS (i.e., operating system) but also data, et cetera, as a result of processing. Memory 63 is used for a temporary memory domain for various tables, or data, used for the arithmetic logical operations.

A storage media drive apparatus 64 is used for reading from, or writing to, a portable storage medium 65 such as a CD-ROM, a DVD, a flexible disk, an IC card.

An input apparatus 66, comprising a keyboard, et cetera, is the apparatus for inputting data. An output apparatus 67 is such as display apparatus.

A network connection apparatus 68 is the apparatus for connecting to a network such as a LAN, the Internet, et cetera, enabling collection of messages from a server as a subject of service on the network through the network connection apparatus 68. In addition, a bus 69 connects the CPU 61, memory 63, external storage apparatus 62, et cetera.

The present invention is not limited to the above described embodiment. The interrupt management tables 41, or 51, are not limited to the structures shown by FIGS. 5 or 8, but any structures containing information identifying interrupts set for the hardware devices 14a through 14d, and indicating priorities and groups may be appropriate. Furthermore, the information indicating the priority of interrupts may be included in the information in the vector numbers for identifying interrupts, et cetera.

The above described embodiment makes it possible to prevent the execution of a low priority interrupt among those defined with different priorities and belonging to the same group from being subjected to deferred processing. Furthermore, lowering the interrupt priority of already processed interrupts in the group makes it possible to process the interrupts belonging to the same group equably.

What is claimed is:

1. An interrupt control method, for making a computer execute a plurality of interrupts which are defined by a different priority, comprising:

dividing the plurality of interrupts defined by different priorities into a plurality of groups and making a storage unit store information for identifying each of the interrupts, priority information for indicating the priority of each of the interrupts, and information for indicating the group to which each of the interrupts belongs;

when receiving an interrupt, accepting the received interrupt and beginning processing of the accepted interrupt while inhibiting acceptance of any other interrupts, including other interrupts having a higher priority in a same group of the interrupt that has begun to be processed;

obtaining, from the storage unit, information for the accepted interrupt; and executing the accepted interrupt and resetting the priority of the executed interrupt to a lowest priory in the group to which the executed interrupt belongs, wherein when one or more interrupts belonging to a same group are received simultaneously, the one or more simultaneously received interrupts are accepted for processing and information for each of the one or more accepted interrupts is obtained from the storage unit and an interrupt having a highest priority among the interrupts in the group to which the one or more accepted interrupts belongs is selected for execution and the executed interrupt is reset to a lowest priory in the group to which the one or more accepted interrupts belongs.

2. The interrupt control method according to claim 1, further comprising:

letting said storage unit store a vector number defined uniquely for each of the interrupts and for indicating the priority each of the interrupts, a group number to which each of the interrupts belongs and the vector number for the highest priority in each of the groups, wherein an interrupt that has the vector number including the highest within one group that is stored in the storage unit will not be accepted after accepting an interrupt.

3. An interrupt control apparatus, comprising:

a registration unit registering a plurality of interrupts with different priorities by dividing the interrupts into groups;

a storage unit storing information to identify each of the interrupts divided into the groups by the registration unit, priority information to indicate a priority of each of the interrupts, and information to indicate the group to which each of the interrupts belongs; and an interrupt control unit performing the functions of:

receiving an interrupt, accepting the received interrupt and indicating that the accepted interrupt is ready for processing, while inhibiting acceptance of any other interrupts, including other interrupts having a higher priority in a same group of the interrupt that has indicated as ready for processing, obtaining, from the storage unit, information for the accepted interrupt, and after execution of the accepted interrupt, resetting the priority of the executed interrupt to a lowest priory in the group to which the executed interrupt belongs, wherein when one or more interrupts belonging to a same group are received by the interrupt control unit simultaneously, the one or more simultaneously received interrupts are accepted for processing and information for each of the one or more accepted interrupts is obtained from the storage unit and an interrupt having a highest priority among the interrupts in the group to which the one or more accepted interrupts belongs is selected for execution and the executed interrupt is reset to a lowest priory in the group to which the one or more accepted interrupts belongs.

4. The interrupt control apparatus according to claim 3, wherein said storage unit stores a vector number being defined uniquely for each of the interrupts and for indicating the priority of each of the interrupts, a group number for the group to which each of the interrupts belongs and the vector number for the highest priority in each of the groups, and said control unit controls the interrupts so as not to accept any interrupt including the one in the highest priority within the group to which the accepted interrupt belongs after accepting the interrupt.

5. A computer readable storage medium encoded with a computer program for performing interrupts with different priorities, the program being executed by a computer to perform a method, comprising:

registering a plurality of interrupts with different priorities by dividing the interrupts into groups;

storing information to identify each of the interrupts divided into the groups, priority information to indicate a priority of each of the interrupts, and information to indicate the group to which each of the interrupts belongs;

receiving an interrupt, accepting the received interrupt and beginning processing of the accepted interrupt while inhibiting acceptance of any other interrupts, including other interrupts having a higher priority in a same group of the interrupt that has begun to be processed;

obtaining, from the stored information, information for the accepted interrupt; and executing the accepted interrupt and resetting the priority of the executed interrupt to a lowest priory in the group to which the executed interrupt belongs, wherein when one or more interrupts belonging to a same group are received simultaneously, the one or more simultaneously received interrupts are accepted for processing and information for each of the one or more accepted interrupts is obtained from the storage unit and an interrupt having a highest priority among the interrupts in the group to which the one or more accepted interrupts belongs is selected for execution and the executed interrupt is reset to a lowest priory in the group to which the one or more accepted interrupts belongs.

* * * * *